Patented Apr. 21, 1936

2,037,948

UNITED STATES PATENT OFFICE 2,037,948

COMPOSITION OF ASPHALT EMULSIONS

Carl David Svensson, Stockholm, Sweden, assignor to Lilly Augusta Svensson, Stockholm, Sweden No Drawing. Application February 19, 1932, Serial No. 594,151. In Sweden February 19, 1931

3 Claims. (Cl. 134—17)

Asphalt has, due to its valuable capacities, and especially as a consequence of its adhering property and water resisting property, found extensive use for a lot of various purposes, such as coating roads, insulation of concrete, impregnation, etcetera. The asphalt is, however, for this purpose incident to serious drawbacks. For instance, it has almost no elasticity, further it is adhesive, and has a relatively low point of softness. Attempts have been made to overcome these drawbacks for instance by adding caoutchouc, which together with asphalt gives a composition having the properties of the asphalt as well as of the caoutchouc. That such a composition has not been more widely used is due to the fact that satisfactory methods for producing the mixture are unknown. To be sure, it has been proposed to add the caoutchouc to the asphalt in the form of solution for instance in benzine, but this method has many drawbacks. Thus the use of benzine not only involves increased costs and risk of fire, but the mixtures require a very long time to dry (up to 3 weeks).

In recent years, however, and to a very great extent, use of asphalt emulsion instead of molten asphalt has been started. The asphalt emulsion is a suspension of asphalt particles in water prepared by adding a suitable emulsification agent. It would then be conceivable to mix the asphalt emulsion with a natural rubber milk (latex), which can be considered as a fine dispersion or colloidal solution of cauotchouc in water with a percentage of caoutchouc amounting to 25–30 percent by weight, and by precipitating the asphalt and the caoutchouc respectively to obtain a composition of the said materials. It has also proved to be possible to obtain such compositions of asphalt emulsion and latex, if before emulsifying the asphalt use of an emulsifying agent of such a character that the caoutchouc coagulates has been avoided, but the said compositions are not durable. On account of the difference in specific weight between caoutchouc and asphalt the latex separates from the asphalt emulsion in such a manner that the lighter particles of the caoutchouc ascend whereas the heavier asphalt particles descend towards the bottom, by which an upper layer of more or less diluted latex and an under layer of asphalt emulsion is formed. It has been tried to overcome this drawback by directly emulsifying the asphalt in preheated latex, by which a more stable composition would be obtained, but such a method has no practical importance on account of the fact that the latex is rather sensitive to heat and coagulates easily during heating. Therefore, it has proven difficult to add molten asphalt for instance of a temperature of 110–120° C. to latex, which has been already preheated, without the formation of lumps or complete coagulation taking place.

The separation can, however, according to the present invention be counteracted or be entirely avoided, if the composition of the asphalt emulsion and latex is made sufficiently viscous, by which the resistance against caoutchouc and the motion of the asphalt particles respectively will become considerable. This increasing of the viscosity of the composition is obtained by using asphalt emulsions concentrated as much as possible, together with latex preparations, which have been concentrated by means of evaporation or concentrated in other ways, and which preparations have been lately produced and brought into the market. The minimum degree of concentration of the asphalt and rubber dispersions employed in accordance with the present invention is 40%.

Thus quite satisfactory results are obtained if for example "Flintcote" (an asphalt emulsion containing about 65 percent by weight of bitumen and of a very viscous consistency depending on the emulsifying agent) is mixed with "Revertex", which is a latex product having 70–80 percent of caoutchouc evaporated by adding a suitable preserving colloid. If one desires a mixture with vulcanized caoutchouc one may use instead of "Revertex" so-called "Revultex" (vulcanized "Revertex" with 60–70 percent by weight of caoutchouc) or the Revertex may be vulcanized. This is suitably made by the addition of 2–3 percent by weight of sulphur and a vulcanizing accelerator as, for example, "Vulcacite", "Tiuram" or the like with an activator, usually zinc oxide.

In case the said vulcanizing additions show a tendency of coagulating the mixture (this concerns especially the zinc oxide), a preserving colloid as for example an ammoniacal solution of casein, "Saprotine", "Nekal" or the like is preferably added to the "Revertex" before being mixed with the emulsion. "Saprotine" is a condensation product of aldehyde and a phenol derivative and "Nekal" is an emulsification agent which contains di-isopropyl naphthaline sulphonic acid up to 10% in admixture with other emulsification agents. Such mixtures of "Flintcote" and "Revertex" (or "Revultex", respectively) show in their undiluted state no or only a slight tendency of separating. Of course not only "Revertex" and "Revultex" may be used, but also any concentrated product of latex.

However, most of the asphalt emulsions (with 45–55 percent of bitumen) on the market are not sufficiently viscous for giving, when mixed with concentrated latex products as for example "Revertex" or "Revultex", a product stable enough for storing the same for a rather long time. In these cases one can add any substance or a mixture of substances, increasing the viscosity of the asphalt emulsion. Besides bentonite, giving very good results, casein and water-glass or mixtures of casein and water-glass have proved to be especially suitable for this purpose yet a great many other thickening substances, such as fatty acids, glycerine, size, gelatine, et cetera, may also be used. The thickening substances must not, however, have an acid character, as they would then cause coagulation, and preferably should not consist of oils which have an unfavourable influence particularly on the asphalt.

As an example of mixtures with thickening substances according to what has been stated above the following may be mentioned:

(1) About 160 parts by weight "Special Colas" (asphalt emulsion with a percentage of bitumen of 45)
About 40 parts by weight "Revertex" mixture
About 15–20 parts by weight casein solution containing 10%

(2) About 180 parts by weight "Special Colas"
About 20 parts by weight "Revertex" mixture
About 10 parts by weight water-glass (3) About 100 parts by weight "Special Colas"
About 2 parts by weight "Leico Gummi" (a dextrine preparation)
About 5–100 parts by weight "Revertex" mixture The "Revertex" mixture consisted according to above examples, of:

2000 parts by weight "Revertex"
200 parts by weight water
4 parts by weight "Vulcacite P"
100 parts by weight oxide of zinc
40 parts by weight sulphur and was first mixed with the thickening substance before being added to the asphalt emulsion.

The products manufactured may be used anywhere or for the purposes where heretofore warm asphalt or asphalt emulsion has been used, for instance for road coatings, et cetera, and they are particularly adapted for insulation of concrete basements, and as impregnation agents, such as for awnings.

Thus, according to the use, mixtures with various percentage of caoutchouc, from 5% to 40% or more, depending on the quantity of asphalt, may be employed. With increasing percentage of caoutchouc, the adhesiveness and the sensibility for temperature of the caoutchouc-asphalt film precipitated from the mixture will decrease, at the same time as its elasticity and properties of durability are improved. On the contrary the adhering property is impaired with increasing percentage of caoutchouc. Before mixing the concentrated latex with the asphalt emulsion, the former can, except additions necessary for the vulcanizing, of course also be improved by other additions favourable for the caoutchouc, such as preservative agents against destruction due to time, fillers, et cetera. Fillers or diluting agents in suitable quantities can also, of course, be added to the ready latex-asphalt emulsion, for instance for coating roads; macadam, rough gravel, gravel, sand, et cetera; for coating floors or for pressing plates, pulverous materials such as stone powder, saw dust, et cetera.

Above latex and latex products have been set forth only in the sense of caoutchouc, but instead of caoutchouc similar products, such as guttapercha, balata, et cetera, can, of course, be advantageously used. The percent figures of this patent relate to percent by weight.

Having now described my invention, what I claim as new and desire to secure by Letters Patent is:

1. An asphalt-rubber composition consisting of 160 parts by weight of an asphalt emulsion containing 45% bitumen, 40 parts by weight of a latex mixture and 15 to 20 parts by weight of a 10% casein solution, in which the latex mixture consists of 2000 parts by weight of concentrated latex containing 70 to 80% caoutchouc, 200 parts by weight of water, 4 parts by weight of a vulcanizing accelerator, 100 parts by weight of zinc oxide, and 40 parts by weight of sulphur.

2. A method of mixing asphalt and rubber emulsions to form a stable viscous asphalt-rubber composition, comprising mixing a viscous asphalt emulsion having a bitumen content of at least 65% with a highly concentrated latex containing from 60 to 80% caoutchouc.

3. A method of mixing asphalt and rubber emulsions to form a stable viscous asphalt-rubber composition, comprising mixing an asphalt emulsion having at least a bitumen content of 45% with a highly concentrated latex containing from 60 to 80% caoutchouc, and adding a non-acid thickening agent to increase the viscosity of the asphalt emulsion.

CARL DAVID SVENSSON.